US007380323B2

(12) United States Patent
Bussell et al.

(10) Patent No.: US 7,380,323 B2

(45) Date of Patent: Jun. 3, 2008

(54) SEAL INSTALLATION TOOL

(75) Inventors: Tyler Wayne Bussell, Manteca, CA (US); Daniel Eric Johnston, Brentwood, CA (US); Richard Linton Samsal, Chandler, AZ (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/355,420

(22) Filed: Feb. 16, 2006

(65) Prior Publication Data

US 2007/0186399 A1 Aug. 16, 2007

(51) Int. Cl.
*B23Q 3/00* (2006.01)

(52) U.S. Cl. .......................................... 29/235; 28/238

(58) Field of Classification Search ................. 29/235, 29/238–239, 270, 278

See application file for complete search history.

(56) References Cited

U.S. PATENT DOCUMENTS 5,217,676 A 6/1993 Morandiere 6,012,209 A 1/2000 Whetstone 6,047,620 A * 4/2000 Kozak et al. ................. 81/441

6,148,493 A * 11/2000 Pixley et al. ................. 29/275

6,360,415 B1 * 3/2002 Wada et al. ............... 29/283.5

FOREIGN PATENT DOCUMENTS

WO WO 98/06104 2/1998

WO WO 98/21534 5/1998

* cited by examiner

*Primary Examiner*—Lee D Wilson

(74) *Attorney, Agent, or Firm*—Lina Yang; Geoffrey L. Chase

(57) ABSTRACT

A tool and a method for installing a seal in a fitting through which gas is flowing is disclosed. The tool has a sleeve with a first socket that receives and holds the seal, and a second socket, adjacent to the first, that receives the fitting. A shaft is axially movable within the sleeve and has a contact surface at one end engageable with the seal. The shaft has a conduit with an inlet in communication with the fitting and an outlet that vents to the atmosphere. The seal is loaded into the first socket, the second socket is engaged with the fitting, and the shaft is advanced to push the seal from the first socket into the fitting. Gas flowing through the fitting is conducted to the atmosphere by the conduit, preventing gas pressure build-up behind the seal.

15 Claims, 3 Drawing Sheets

SEAL INSTALLATION TOOL

BACKGROUND OF THE INVENTION

Gases used in industrial processes, such as the manufacture of integrated circuits on silicon substrates, must be maintained at a high level of purity to ensure that they remain chemically active and furthermore do not contaminate the workpiece upon which they are used. The gases are often highly reactive and hazardous, and even minute amounts of moisture, oxygen or particles can have a significant adverse effect and are to be avoided.

The gases are stored in a compressed state in tanks, which have various valves, seals and fittings necessary to connect the tanks to other equipment that use the gases in the manufacturing processes. While the valves, seals and fittings are designed and manufactured to maintain the high degree of gas purity required, a challenge arises when coupling and uncoupling the fittings because there is the potential to introduce the aforementioned contaminants into the gases. This problem is effectively avoided by allowing a purge gas to flow from a fitting while it is disconnected, the purge gas effectively preventing moisture, oxygen or particles from entering the fitting and posing a contamination problem until the fitting is reconnected fluid-tight to another component.

The purge gas flow occurs at pressures between about 10 psi and 20 psi above atmospheric pressure. This relatively high pressure makes it difficult to manually install a seal in a fitting prior to attachment to a mating fitting. When the seal is seated manually it is difficult to keep the opening in the seal clear, as a finger or a thumb must apply force to the seal to properly seat it within the fitting. With the seal opening obstructed during seating, purge gas pressure builds up behind the seal, which often pops out of the fitting as a result of the purge gas pressure when the installing force is removed.

To further complicate the seal installation process, technicians often must wear bulky protective clothing due to the hazardous nature of the gases. The clothing includes gloves that prevent contamination of the seal and other hardware but also reduce tactile sensation and thus make it difficult to deftly handle the seals. Additionally, the fittings are often recessed within housings and are not visible when a seal is being installed. These complications result in lost seals, as seals are dropped during installation or ejected from the fitting due to purge gas pressure build-up, and cause significant lost time and added expense to the industrial process in which the gas is used. There is clearly a need for a tool and a method to facilitate installation of seals in fittings through which purge gas is flowing.

BRIEF SUMMARY OF THE INVENTION

The invention concerns a tool for installing a seal in a fitting. The tool comprises a sleeve having a first socket sized to receive the seal, and a second socket positioned adjacent to the first socket. The second socket defines an open end of the sleeve and is sized to receive the fitting. A pusher element is movable within the sleeve. The pusher element has a contact surface engageable with the seal for moving the seal out of the first socket and into the fitting when the pusher element is moved relatively to the sleeve.

Preferably, the pusher element comprises a shaft having the contact surface at one end. The shaft has a conduit therein. The conduit has an inlet positioned at the one end providing fluid communication with the fitting, and an outlet providing fluid communication with the atmosphere. The outlet allows gas to escape from the fitting to the atmosphere when the second socket is engaged with the fitting. A handle is attached to the shaft in spaced relation to the sleeve. A biasing element is positioned between the sleeve and the handle. The biasing element biases the sleeve in a direction away from the handle.

The invention also includes a method of installing a seal in a fitting through which gas is flowing. The method comprises:

(a) providing a sleeve having a first socket to hold the seal and a second socket, adjacent to the first socket, to receive the fitting;

(b) providing a pusher element movable within the sleeve for pushing the seal from the sleeve into the fitting, the pusher element having a conduit with an inlet positioned within the sleeve and an outlet in fluid communication with the atmosphere;

(c) positioning a seal within the first socket;

(d) engaging the second socket with the fitting;

(e) moving the pusher element relatively to the sleeve to engage and push the seal from the first socket into the fitting; and (f) permitting the gas to flow from the fitting through the sleeve, through the conduit, and out to the atmosphere.

DETAILED DESCRIPTION OF THE INVENTION

Figure 2:
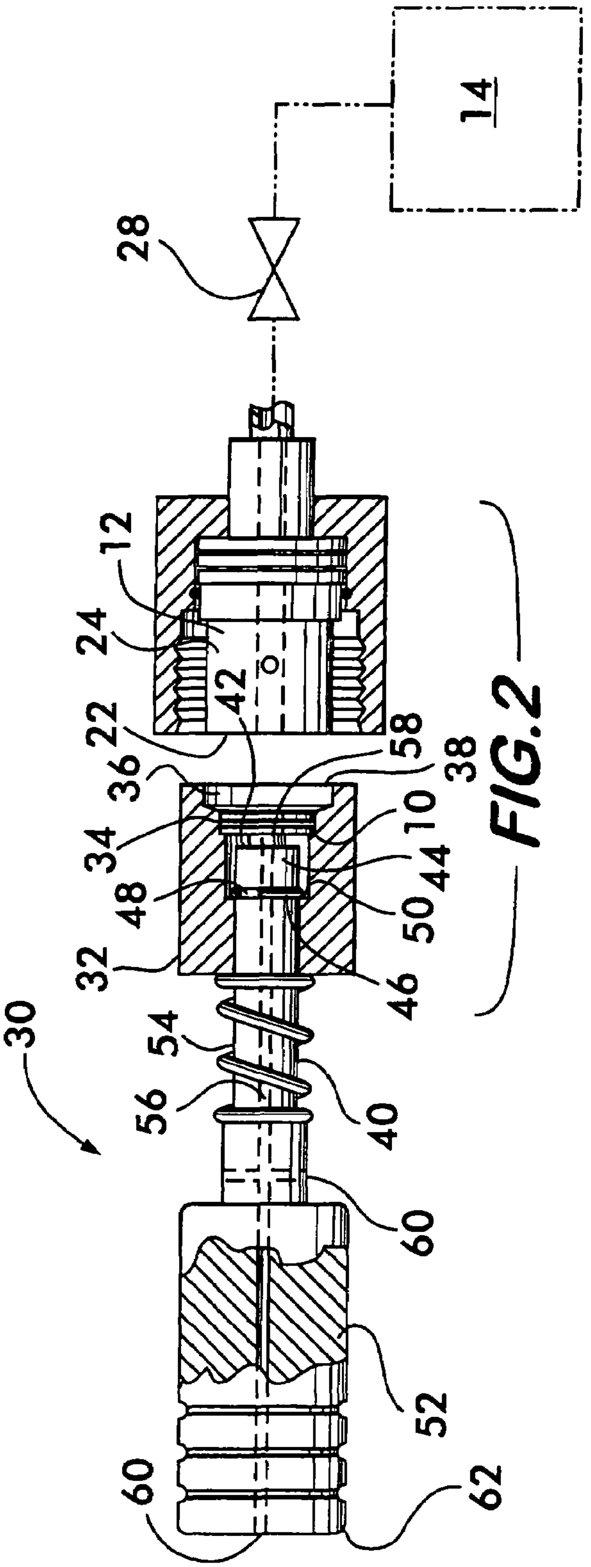
FIG. 2 is a longitudinal sectional view of a fitting through which purge gas passes connected to a tank of compressed gas (shown schematically in phantom line), and a tool according to the invention for seating a seal in the fitting.
Figure 1:
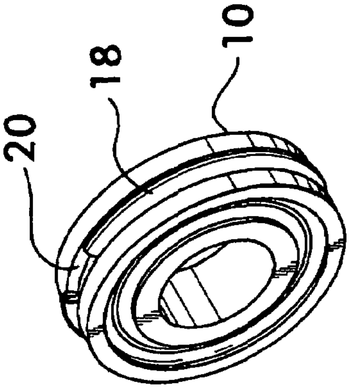
FIG. 1 is a perspective view of an example seal for compressed gas fittings.

FIG. 1 shows a perspective view of a seal 10 used with a fitting 12 (see FIGS. 2-4) connected to a source of pressurized gas, such as a tank 14, illustrated schematically in phantom line. Seal 10 may be, for example, a stainless steel washer that is nickel plated. Stainless steel is advantageous for its inert characteristics and will therefore tend not to be a source of contamination. The nickel plating enhances the inert qualities and also provides a surface that will readily form a fluid tight seal when engaged with a seat of the fitting 12. The seal 10 may be round in cross section and have a nominal diameter of about 9/16 inch and a thickness of about 1/8 inch. These dimensions are provided by way of example only, and are not intended to limit the size of the seal or the tool described and claimed herein.

A radial spring 18, also preferably formed of stainless steel, is positioned within a groove 20 circumferentially around the seal. The radial spring 18 may comprise an oversized split ring having a gap that allows the ring to be radially flexible. The radial spring provides a flexible element that exerts a force directed radially outwardly when it is compressed radially inwardly. Radial spring 18 frictionally retains the seal 10 within the fitting 12, the fitting having an opening 22 that is smaller in diameter than the diameter of the radial spring 18. When the seal 10 is inserted into the opening 22, the fitting sidewall 24 radially compresses the spring, which pushes back and frictionally holds the seal within the fitting.

To prevent contaminants such as moisture, oxygen and particulates from entering the fitting 12 when it is not coupled to another component, purge gas is permitted to flow through the fitting 12 from tank 14, the gas flow being controlled by a purge gas valve 28 between the tank and the fitting. To facilitate installation of seal 10 into fitting 12 while purge gas is flowing through the fitting, a tool 30 is used. Tool 30 comprises a sleeve 32 having a first socket 34 sized to receive and hold the seal 10. The diameter of socket 34 is smaller than the radial spring 18 so that when the seal is inserted within the socket it is frictionally retained therein by the radial spring action.

Sleeve 32 has a second socket 36 positioned adjacent to the first socket 34. The second socket has a larger diameter than the first socket and defines an open end 38 of the sleeve. The second socket is sized to co-axially receive the fitting 12 through the open end 38, and the first and second sockets cooperate to align the seal 10 with the opening 22 in fitting 12 for installation of the seal against the seat 16.

A pusher element, preferably in the form of a shaft 40, is axially movable within the sleeve 32. Shaft 40 has a contact surface 42 at one end 44 that is engageable with the seal 10 seated within the first socket 34. Sleeve 32 is retained to the shaft by an O-ring 46 mounted within a groove 48 positioned near the end 44 of the shaft 40. The O-ring has a greater outer diameter than the shaft and engages a shoulder 50 within the sleeve, the interaction between the shoulder and the O-ring limiting the motion of the sleeve toward end 44, preventing the sleeve from falling off of the shaft. Other retaining elements, such as snap rings and the like are also feasible.

A handle 52 is attached to the shaft 40 in spaced relation away from the shaft end 44. The handle may be formed from a polymer resin and is sized and shaped to ergonomic advantage to provide a good manual grip. A biasing element, preferably in the form of a compression spring 54 is positioned between the handle and the sleeve. Spring 54 biases the sleeve 32 away from the handle 52, pushing the shoulder 50 against the O-ring 46 and holding the contact surface 42 at the end 44 of shaft 40 in spaced relation from the seal 10 when it is held in first socket 34.

Figure 5:
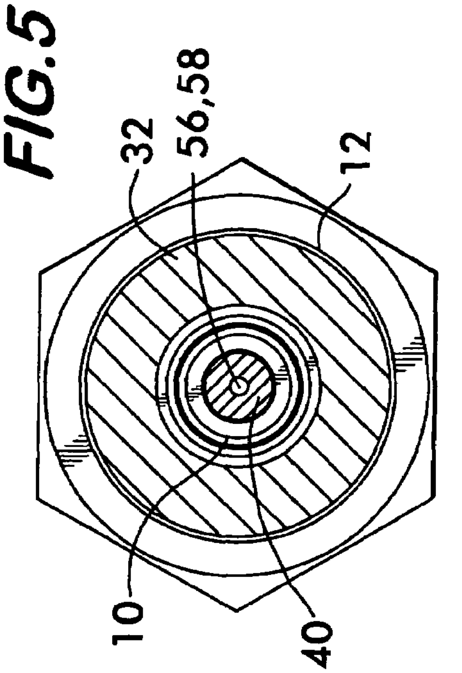
FIG. 5 is a cross sectional view taken at line 5-5 of FIG. 3.

The shaft 40 also has a conduit 56 positioned within it (see also FIG. 5). The conduit has an inlet 58 positioned at the end 44 of the shaft so that the conduit is in fluid communication with the fitting 12 when the fitting is received within the second socket 36. Conduit 56 has an outlet 60 that provides fluid communication with the atmosphere. The outlet may be positioned at the opposite end 62 of the shaft or it may be advantageously positioned between the handle 52 and the sleeve 32. Other positions for outlet 60 are also feasible.

Figure 3:
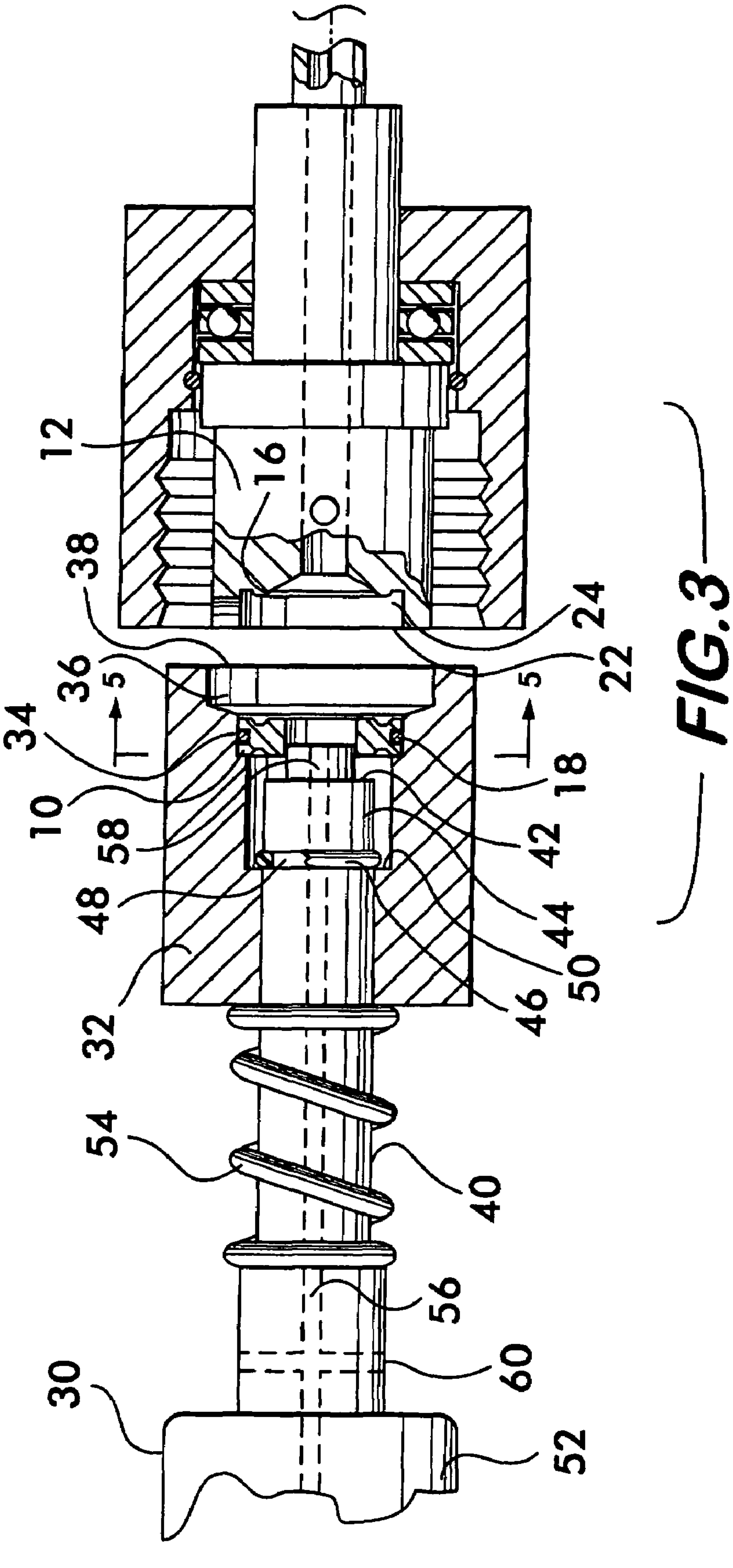
FIGS. 3 and 4 are longitudinal sectional views depicting a portion of the tool on an enlarged scale and in operation.

In operation, as shown with reference to FIG. 3, the seal 10 is inserted into the first socket 34. The tool 30 is then maneuvered to engage the second socket 36 with the fitting 12, the open end 38 of the sleeve 32 coaxially receiving the fitting 12, and the seal 10 being aligned with the fitting opening 22. Purge gas that is flowing through the fitting enters the inlet 58 and is conducted through the conduit 56, exiting to the atmosphere through outlet 60. No significant purge gas pressure is permitted to form within the fitting as a result of the conduit 56.

Figure 4:
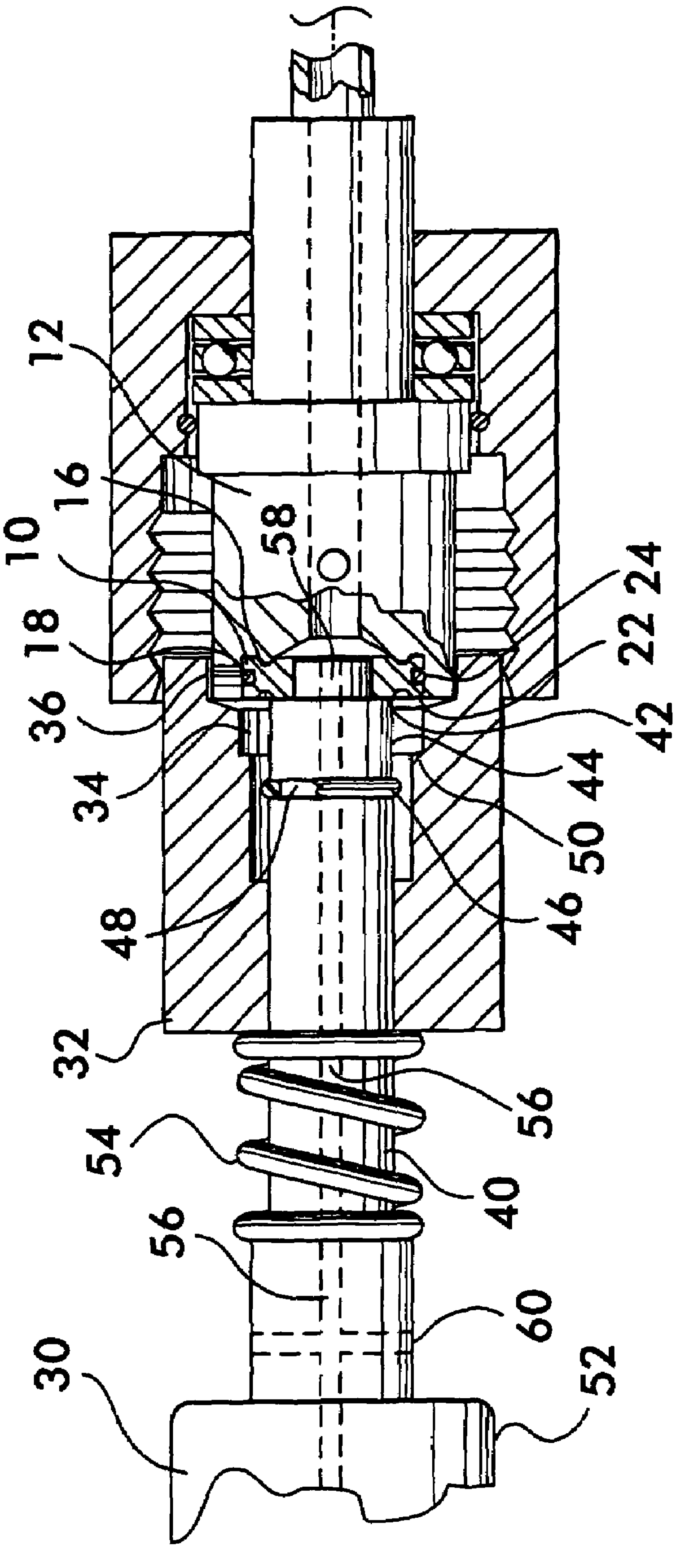

As shown in FIG. 4, with the fitting received within the second socket 36, force is manually applied to the handle 52, advancing the shaft 40 axially within the sleeve 32 against the biasing force of spring 54, compressing the spring. The sleeve remains relatively fixed by its engagement with the fitting. The contact surface 42 at the end 44 of shaft 40 pushes the seal 10 from the first socket 34 into the fitting opening 22, seating the seal against seat 16. The radial spring 18 is compressed between the fitting sidewall 24 and the seal 10, thereby frictionally holding the seal within the fitting. The tool 10 is then withdrawn, disengaging the contact surface 42 from the seal and the second socket 36 from the fitting, but leaving the seal 10 seated within the fitting. The conduit 56 in the shaft 40 permits purge gas to flow constantly throughout the installation process, and therefore the purge gas never has the opportunity to build significant pressure behind the seal that will unseat the seal when the tool is removed. Upon disengagement of the tool from the fitting, biasing spring 54 pushes the sleeve 32 in a direction away from the handle 52, clearing the shaft 40 from the first socket 34 and thereby allowing another seal to be loaded for installation in another fitting.

It is advantageous to make the sleeve 32, shaft 40 and spring 54 from stainless steel to provide a robust tool that is substantially inert and therefore will not be a significant source of contamination. Other materials are also feasible. O-ring 46 may be a flurocarbon compound, such as polytetrafluoroethylene for its inert and low-friction qualities as well.

The invention claimed is:

1. A tool for installing a seal in a fitting, said tool comprising:

a sleeve having a first socket sized to receive said seal, and a second socket positioned adjacent to said first socket, said second socket defining an open end of said sleeve and being sized to receive said fitting;

a pusher element movable within said sleeve, said pusher element having a contact surface engageable with said seal for moving said seal out of said first socket and into said fitting when said pusher element is moved relatively to said sleeve, and said pusher element comprises a shaft having said contact surface at one end thereof, wherein said shaft has a conduit therein, and said conduit having an inlet positioned at said one end providing fluid communication with said fitting, and an outlet providing fluid communication with the atmosphere to allow gas to escape from said fitting to the atmosphere when said second socket is engaged with said fitting.

2. A tool according to claim 1, further comprising a handle attached to said shaft in spaced relation to said sleeve.

3. A tool according to claim 2, further comprising a biasing element positioned between said sleeve and said handle, said biasing element biasing said sleeve in a direction away from said handle.

4. A tool according to claim 3, wherein said biasing element comprises a compression spring acting between said sleeve and said handle.

5. A tool according to claim 1, wherein said outlet is positioned at another end of said shaft.

6. A tool according to claim 1, further comprising a handle attached to said shaft in spaced relation to said sleeve, said outlet being positioned between said handle and said sleeve.

7. A tool for installing a seal into a fitting of a tank holding a pressurized gas while said gas is flowing through said fitting, said tool comprising:

a sleeve having a first socket sized to coaxially receive and hold said seal, and a second socket positioned adjacent to said first socket and co-axial therewith, said second socket having a larger diameter than said first socket and defining an open end of said of said sleeve, said second socket being sized to coaxially receive said fitting;

a shaft axially movable within said sleeve, said shaft having a contact surface at one end engageable with said seal for moving said seal out of said first socket and into said fitting when said pusher element is moved axially relatively to said sleeve;

a conduit extending through said shaft, said conduit having an inlet positioned at said one end providing fluid communication with said fitting, and an outlet providing fluid communication with the atmosphere, said gas flowing through said conduit to the atmosphere when said second socket is engaged with said fitting.

8. A tool according to claim 7, wherein said outlet is positioned at another end of said shaft.

9. A tool according to claim 7, further comprising a handle attached to said shaft in spaced relation away from said sleeve.

10. A tool according to claim 9, wherein said outlet is positioned on said shaft between said sleeve and said handle.

11. A tool according to claim 9, further comprising a biasing element positioned between said handle and said sleeve for biasing said sleeve in a direction away from said handle.

12. A method of installing a seal in a fitting through which gas is flowing, said method comprising:

providing a sleeve having a first socket to hold said seal and a second socket, adjacent to said first socket, to receive said fitting;

providing a pusher element movable within said sleeve for pushing said seal from said sleeve into said fitting, said pusher element having a conduit with an inlet positioned within said sleeve and an outlet in fluid communication with the atmosphere;

positioning a seal within said first socket;

engaging said second socket with said fitting;

moving said pusher element relatively to said sleeve to engage and push said seal from said first socket into said fitting; and permitting said gas to flow from said fitting through said sleeve, through said conduit, and out to the atmosphere.

13. A tool for installing a seal into a fitting of a tank holding a pressurized gas, said tool comprising:

a sleeve having a first socket sized to coaxially receive and hold said seal, and a second socket positioned adjacent to said first socket and co-axial therewith, said second socket having a larger diameter than said first socket and defining an open end of said sleeve, said second socket being sized to coaxially receive said fitting;

a shaft axially movable within said sleeve, said shaft having a contact surface at one end engageable with said seal for moving said seal out of said first socket and into said fitting when said shaft is moved relatively to said sleeve, wherein said shaft has a conduit therein, and said conduit having an inlet positioned at said one end providing fluid communication with said fitting, and an outlet providing fluid communication with the atmosphere when said second socket is engaged with said fitting to allow said gas to escape from said fitting to the atmosphere;

a handle attached to said shaft in spaced relation away from said sleeve;

a biasing element positioned between said handle and said sleeve for biasing said sleeve in a direction away from said handle.

14. A tool according to claim 13, wherein said outlet is positioned at another end of said shaft.

15. A tool according to claim 13, wherein said outlet is positioned on said shaft between said sleeve and said handle.

* * * * *